Dec. 23, 1952  J. RABINOW  2,622,713
HIGH-SPEED MAGNETIC FLUID CLUTCH
Filed Nov. 17, 1949
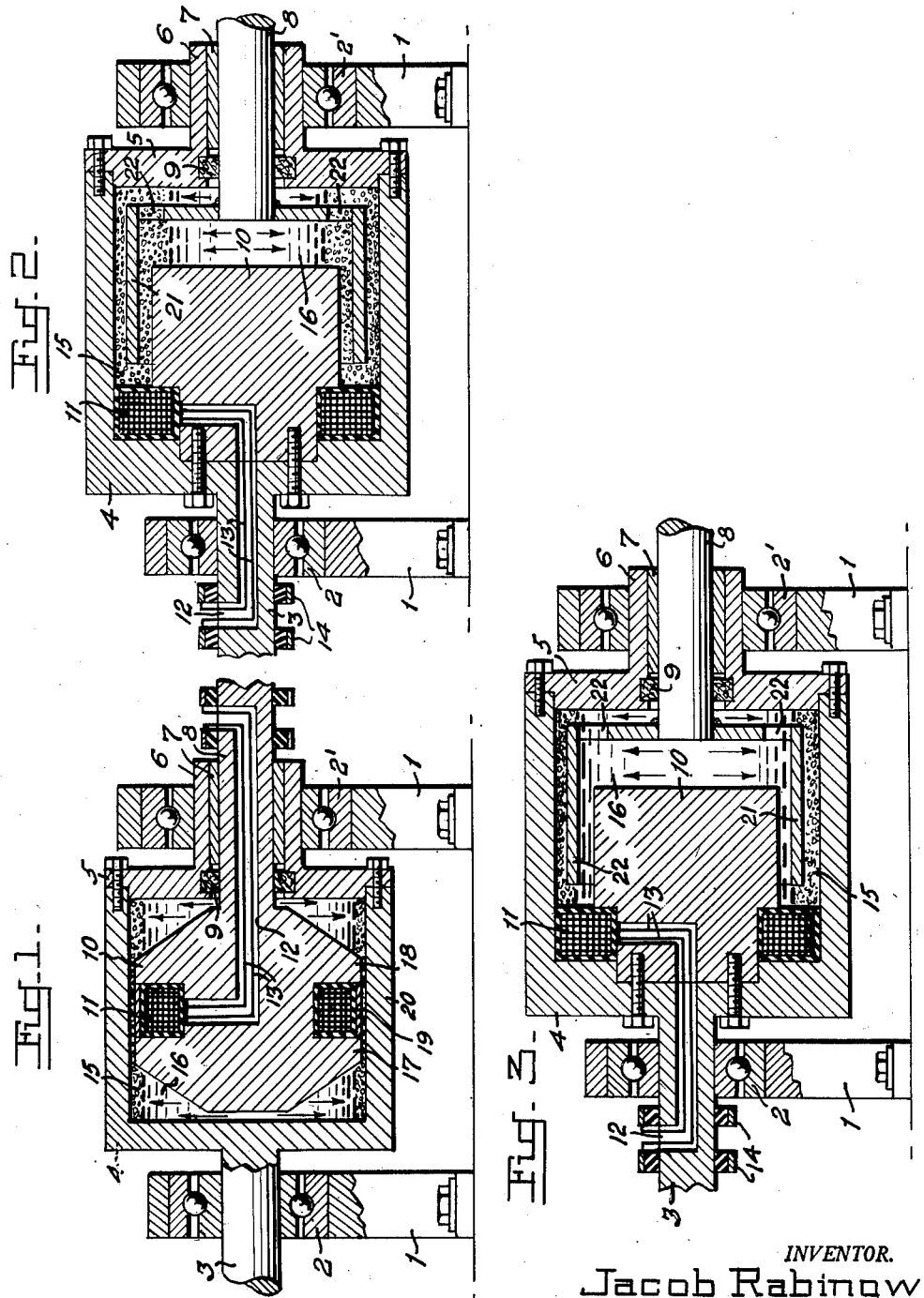
INVENTOR.
Jacob Rabinow
BY
G. J. Kessenich, J. H. Church & M. L. Libman
Attorneys.

Patented Dec. 23, 1952

2,622,713

UNITED STATES PATENT OFFICE 2,622,713

HIGH-SPEED MAGNETIC FLUID CLUTCH

Jacob Rabinow, Takoma Park, Md., assignor to the United States of America as represented by the Secretary of the Army Application November 17, 1949, Serial No. 127,901

8 Claims. (Cl. 192—21.5)

(Granted under the act of March 3, 1883, as amended April 30, 1928; 370 O. G. 757)

The invention described in the specification and claims may be manufactured and used by or for the Government for governmental purposes without the payment to me of any royalty thereon.

My invention relates to magnetic fluid clutches of the type employing a mixture of paramagnetic particles such as iron and a fluid vehicle such as oil, which, when subjected to a magnetic field, acts to transmit force between two otherwise independently movable members. This mixture will be referred to hereinafter as iron-oil for convenience, but it will be understood that any paramagnetic powder is contemplated, and any suitable fluid may be used. It will be further understood that the paramagnetic material may be used without the fluid.

It is known that the fluid in this clutch acts chiefly as a lubricant and the magnetic action of the clutch is independent of the fluid used. Dry paramagnetic particles alone have been successfully used.

In the art of magnetic fluid devices and more particularly of magnetic fluid clutches as described in my copending applications, Serial No. 51,402, filed September 21, 1948, and Serial No. 783,426, filed October 31, 1947, now Patent No. 2,575,360 issued November 20, 1951, respectively, it is desirable that the effects of centrifugal force be kept at a minimum so that the device will be completely responsive to changes in the current used to actuate it. In conventional types of magnetic fluid clutches, centrifugal force causes the iron particles in the iron-oil mixture to be impelled toward the periphery of the rotating chamber, and to become packed due to the large radial head of iron particles. If rapid control is to be achieved, it is necessary that this condition be overcome. To achieve this end I have invented a modified form of electromagnetic fluid clutch in which a small quantity of magnetic powder is used, as compared with prior practice, as will be apparent to one skilled in the art from reference to the accompanying description and drawings, in which:

Figure 1 represents one form of electromagnetic clutch of this type;

Figure 2 shows a second form of electromagnetic clutch of this type; and

Figure 3 shows a differently filled clutch of this type.

Referring now to Figure 1, suitable supports 1 are provided to mount bearings 2, 2′. A shaft 3 rotates in bearing 2 and has formed upon or fixed to its end a cup-shaped member 4, which together with end plate 5 forms the outer housing of the clutch. Formed on or affixed to end plate 5 is hollow shaft 6, which passes through bearing 2′, and which contains journal bearing 7 in which shaft 8 may rotate. An O ring 9 provides an oil seal between end plate 5 and shaft 8. Mounted upon shaft 8 is clutch member 10 which is internal to chamber 4. Member 10 is grooved to accommodate winding 11 which is of electrically insulated wire. A passageway 12 in member 10 and shaft 8 permits passage of a wire 13 which terminates in slip rings 14. A space as shown is left between member 10 and cup 4 to accommodate a mixture of iron powder and light oil. The mixture is so proportioned that only enough powder 15 to fill the cylindrical gap or minimum peripheral space between member 10 and cup 4 is used, the rest of the space including the radially extending gap joining into the cylindrical gap being occupied by light oil 16, or the oil may be omitted in its entirety. When relative rotation exists between member 10 and cup 4, the iron powder 15 and oil 16 become mixed. But when rotational speed of cup 4 becomes so great that appreciable centrifugal force is created, powder 15 is urged outwardly so that only a small amount of drag upon member 10 is produced, thus facilitating quick release of the clutch on de-energization thereof.

Both member 10 and cup 4 are made of magnetic material. Thus, it will be seen that when current is passed through coil 11, magnetic poles will be established at portions 17 and 18 of member 10 and correspondingly at positions 19 and 20 of cup 4, the magnetic path or lines of magnetic flux thus passing from 17 through powder 15 to 19, thence to 20, again through powder 15 and returning to 18, so that the iron powder 15 will be attracted to path 17—19 and path 18—20 with a force depending upon the amount of current passing through coil 11, and so controlling the amount of rotational force transmitted from the driving member to the driven member.

With reference now to Figure 2, supports 1 are provided for bearings 2, 2′. Shaft 3 passes through bearing 2 supporting external cup 4 which forms a chamber completed by end plate 5 to which is affixed or on which is formed hollow shaft 6 which passes through bearing 2′, and in which bearing 7 is inserted to serve as a journal for shaft 8. Packing 9 positioned between end plate 5 and shaft 8 serves as an oil seal. Member 10, which is affixed to cup 4 and shaft 3, is shaped to accept an electrically insulated coil 11 positioned approximately as shown. To the internal end of shaft 8 is affixed internal cup 21 which is perforated with holes 22 to permit circulation of the iron-oil mixture 15, 16. It will be seen that cup 21 is positioned approximately midway between cup 4 and member 10. Shaft 3 and member 10 are provided with a passageway 12 to accommodate lead wires 13 which terminate in slip rings 14. When current is caused to flow through coil 11 a magnetic field is set up with outer cup 4 becoming one pole of the magnetic circuit and member 10 becoming the other pole. Similar poles are magnetically induced in cup 21, the polarity of the external surface of cup 21 being opposite in polarity to that of cup 4; and the polarity of the inner surface of cup 21 being opposite in polarity to that of member 10. The proportion of iron and oil in the electromagnetic fluid is such that under centrifuging the iron will occupy only the cylindrical gap or peripheral space between member 10 and cup 21 and between cup 21 and the inner periphery of cup 4, with some small additional amount of powder substantially as shown. When current is passed through coil 11 as heretofore described, the iron powder will be attracted through the magnetic path previously discussed, causing the powder to adhere to the outer periphery of 10, the inner periphery of cup 4 and to both peripheries of cup 21, with a force dependent upon the strength of the current in coil 11, limited only by the design of said coil and the saturation point of the magnetic circuit.

With reference now to Figure 3, it will be seen that the mechanical arrangement of the parts is identical with that shown in Figure 2, except that the amount of iron 15 has been decreased so that it fills but slightly more than the space between the cylindrical gap or outer periphery of cup 21 and the inner periphery of cup 4. This modification does not transmit as much torque for a given configuration of clutch as does the filling shown in Figure 2, but where high speed operation is required it transmits far less rotational drag between shaft 8 and shaft 3, when the coil 11 is de-energized.

The previous practice with respect to the iron-oil has been to first make up a mixture of a predetermined proportion of magnetic particles to fluid, and then to use this mixture to fill the clutch. This resulted in a random amount of solid matter, in practice, a surplus of iron particles always being provided, because, if a very thin mixture were to be used, so that there were not enough particles to fill the gap, only a small amount of force could be transmitted, therefore a fairly thick mixture was always used. In any case, the previous practice entirely failed to consider the packing effect due to the great head of surplus metallic particles. When this is amplified by the effect of centrifugal force at high rotational speeds, it will be apparent that a very great improvement in the packing effect can be obtained by using no more than enough particles to do the work. Very few of the particles are lost in a well-designed clutch, even after long use of the clutch, because they tend to stay in place; and even where a sufficient number of particles may migrate to require special precautions to eliminate the possibility of their harming the bearings, these errant particles are too few in practice to appreciably affect the operation of the clutch or to appreciably reduce the effective number of particles remaining in the clutch. However, there is some loss of oil during prolonged operation of the clutch, tending to dry it out. In the past, it has been the practice to add more of the original mixture when the clutch appears to be getting dry. This of course still further increases the ratio of metal particles to oil in the clutch and still further increases the head of iron particles, and the tendency to pack will become more pronounced. In accordance with my invention only oil is added if the clutch appears to be drying out, and the quantity of metal particles remains unchanged. When dry paramagnetic particles alone are used the oil leakage problem does not arise.

The essential feature of my invention is therefore that the amount of metal particles put into each clutch is measured out for that particular clutch and enough oil is added to fill the rest of the available space, if oil is to be used. While this may appear to be very simple, it involves a radical departure from both the thinking and the procedure of the prior art, which first determined a ratio of metal particles to fluid, and then filled the clutch with a mixture having this ratio, and thus provided no correct determination of the proper amount of magnetic material essential to provide both efficient operation and absence of packing. It would appear that the correct proportion would sometimes be attained by chance, but even this did not occur in practice because the mixtures used practically all provided too much iron, and even if the correct amount were to be used by pure chance the first time, the practice of adding more mixtures subsequently, insured an oversupply of metal particles eventually.

I claim:

1. A magnetic fluid clutch comprising two relatively movable members between which force is to be transmitted, said members having respectively spaced, opposed, cylindrical, coaxial, surfaces, said surfaces defining a cylindrical gap, a material comprising paramagnetic particles and a liquid in said gap, enclosure means for the ends of said gap constructed to retain said material in said gap and providing at least one radially extending gap joining into said cylindrical gap; said liquid only in said radially extending gap; and means for subjecting said paramagnetic particles to the action of a magnetic field to control the transmission of force between said relatively movable members.

2. A magnetic fluid clutch comprising two aligned rotatable shafts, a coaxial cylindrical member fixed on the end of one shaft and defining a cylindrical container having end walls and a cylindrical inner surface, an aperture in the end wall remote from said one shaft, the second of said shafts extending through said aperture, a second cylindrical member fixed to the end of said second shaft within said cylindrical container and having an outer surface spaced from said inner surface, means for maintaining a magnetic field in the space between said surfaces, a quantity of paramagnetic particles in the space between said cylindrical surfaces, said quantity being substantially sufficient to extend from said cylindrical inner surfaces radially inward a distance corresponding to the distance between said opposed surfaces, and a quantity of fluid filling the remaining space within the cylindrical container.

3. The invention recited in claim 2 wherein said second cylindrical member is in the form of a second cylindrical container having an inner cylindrical surface and one open and one closed end, and a third cylindrical member fixed to and coaxial with said first member, projecting into said open end and having a cylindrical outer surface, said first and third cylindrical members defining a gap into which said second cylindrical member extends, and radial gaps between the ends of said cylinders.

4. The invention recited in claim 3 wherein the closed end of said second cylindrical container is provided with at least one aperture to permit circulation of the fluid.

5. A magnetic clutch comprising two relatively movable members between which force is to be transmitted, said members having respectively spaced, opposed, cylindrical, coaxial surfaces, said surfaces defining a cylindrical gap; inclosure means for the ends of said gap and providing at least one radially extending gap joining into said cylindrical gap, a quantity of paramagnetic particles in said cylindrical gap, said quantity being limited to an amount sufficient to fill said cylindrical gap, and means for subjecting said paramagnetic particles to the action of a magnetic field to control the transmission of force between said relatively movable members.

6. A magnetic clutch comprising two relatively movable members between which force is to be transmitted, said members having respectively spaced, opposed, cylindrical, coaxial surfaces, said surfaces defining a cylindrical gap, a fluid material comprising paramagnetic particles and oil in said gap, enclosure means for the ends of said gap constructed to retain said fluid material in said gap and providing at least one radially extending gap joining into said cylindrical gap, oil only in said radially extending gap, and means for subjecting said paramagnetic particles to the action of a magnetic field to control the transmission of force between said relatively movable members.

7. A magnetic clutch comprising two relatively movable members between which force is to be transmitted, said members having respectively spaced, opposed coaxial surfaces, said surfaces defining a cylindrical gap, a quantity of contiguous discrete paramagnetic particles in said gap, enclosure means for the ends of said gap constructed to retain said particles in said gap and providing at least one radially extending gap joining into said cylindrical gap, said quantity of paramagnetic particles being limited to an amount sufficient to substantially fill said cylindrical gap and means for subjecting said paramagnetic particles to a magnetic field to control the transmission of force between said relatively movable members.

8. A magnetic fluid clutch comprising two relatively movable members between which force is to be transmitted, said members having respectively spaced, opposed, cylindrical, coaxial surfaces, said surfaces defining a cylindrical gap, a quantity of contiguous discrete paramagnetic particles in said cylindrical gap, said quantity being limited to an amount sufficient to substantialy fill the said gap, enclosure means for the ends of the said gap constructed to retain the said particles in said gap, and means for subjecting the said paramagnetic particles to the action of a magnetic field to control the transmission of force between said relatively movable members.

JACOB RABINOW.

REFERENCES CITED

The following references are of record in the file of this patent:

UNITED STATES PATENTS

| Number | Name | Date |
|---|---|---|
| 2,519,449 | Findley | Aug. 22, 1950 |
| 2,525,571 | Winther | Oct. 10, 1950 |

OTHER REFERENCES

Technical Report 1213, National Bureau of Standards, Washington, D. C.